UNITED STATES PATENT OFFICE.

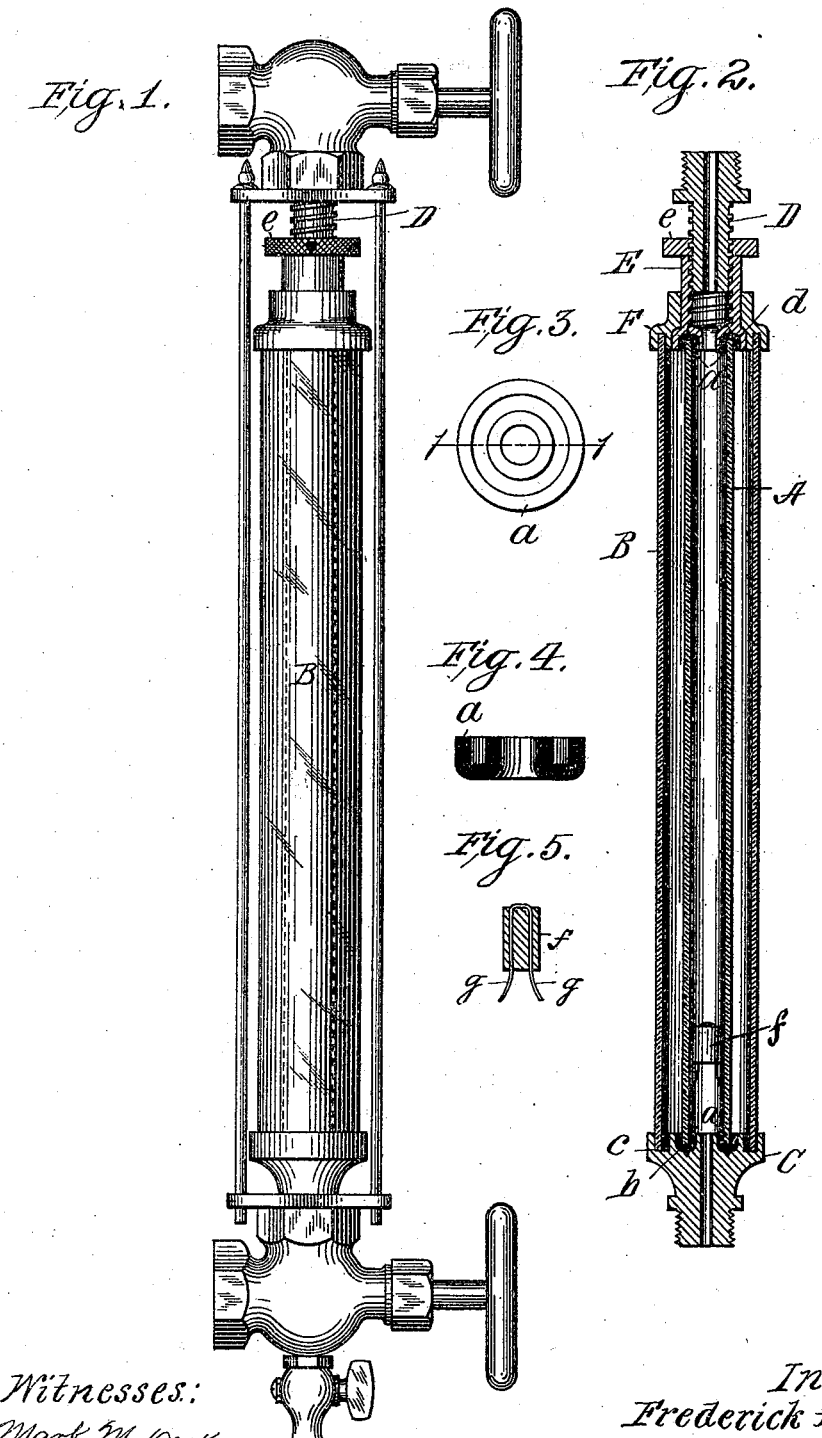

FREDERICK H. HAUSMAN, OF SAN FRANCISCO, CALIFORNIA.

WATER-GAGE.

SPECIFICATION forming part of Letters Patent No. 502,073, dated July 25, 1893.

Application filed October 19, 1892. Serial No. 449,407. (No model.)

*To all whom it may concern:*

Be it known that I, FREDERICK H. HAUSMAN, a citizen of the United States, residing at San Francisco, in the county of San Francisco and State of California, have invented certain new and useful Improvements in Water-Gages, of which the following is a full, clear, and exact specification.

This invention relates to water gages for steam boilers, and it comprises certain improvements bearing upon United States Patent No. 479,235, dated July 19, 1892, granted to William A. Woods.

The object of my invention is to simplify the construction of water gages, thereby lessening the cost of production and at the same time greatly facilitating the mode of operation.

With this object in view I will proceed to describe my invention in detail, reference being had to the accompanying drawings, in which like letters of reference indicate corresponding parts in all the figures alike.

Figure 1 is a side elevation of my improved gage. Fig. 2 is a central vertical section of the same. Fig. 3 is a plan view of the improved rubber gasket employed with my gage, and Fig. 4 is a transverse section of the same, taken on line 1 1 of Fig. 3. Fig. 5 is a vertical sectional view of my improved float.

As in Patent No. 479,235 before referred to I employ both inner and outer gage glasses, the outer one for the purpose of protecting the inner glass from atmospheric action and accidental breakage; but I employ a simplified means for adjusting these glasses as follows:

A represents the inner gage glass, and B the outer protecting glass. The inner glass A is provided at both its ends with rubber gaskets $a$ of a novel shape. A seating plate C is provided at the lower end of the gage, and is screwed into or otherwise secured to an ordinary angle valve controlling the flow of water from the boiler to the gage. Said seating plate C is provided with the annular grooves $b$ and $c$ for receiving the lower ends of the glasses A and B respectively.

The form of the gasket which I employ is as shown—double U shape in cross section. With the aid of this gasket a perfectly steam tight joint is effected between the lower end of the glass tube A and the seating plate C.

A nick or recess $b'$ is cut in the groove $b$, against the edges of which nick the gasket will press when in position, thereby adding to the security of the joint.

I provide an improved means for connecting the gage glass with the valve, of the following construction:

For the aforesaid purpose I employ what I please to term a steam pin D, which is screwed into an ordinary angle valve. This pin D has a lower extension which is provided on its exterior surface with a male thread, by means of which it is screwed into a collar E. Said collar E is provided at its lower end with a groove $d$ adapted to receive the upper end of the inner gage glass A with gasket $a$, whereby the said glass is held rigidly in an upright position. The said gasket prevents any leakage around the steam pin D aforesaid. A loose collar F is placed over the collar E upon which it is free to rise and fall. This loose collar F is intended for the purpose of holding the outer protecting glass B in a vertical position, and it is adapted to be lifted either by the collar E, or independently of said collar.

When it is desired to remove both the inner and outer gage glasses, the hand wheel $e$ is revolved to the right, whereby the collar E and loose collar F will be caused to travel upward together, releasing the hold of said collars from the glasses, when said glasses can be readily removed and new ones inserted. The ordinary gage protecting rods are employed in this my invention, to prevent the glasses from being accidentally struck.

For the purpose of better indicating the amount of water contained in the boiler and gage, I employ a float as in the patent above referred to. This float is indicated in the drawings by the letter $f$ and is composed of cork or other suitable buoyant material, having a wire or narrow strip of non-corrosive or rust proof metal $g$ passed through it; the ends of said wire being somewhat spread apart for the purposes of preventing the said wire from working out of the cork, and at the same time forming a support for preventing the float from entirely closing the opening or passage during the operation of blowing off the sediment, &c.

In the case of cork being used for the float

I prefer to coat it with asbestus or other heat proof paint.

Having now described my invention, I declare that what I claim is—

1. In a water gage the combination with inner and outer gage glasses of a seating plate having annular grooves to receive the lower ends of the glasses, together with collars movable vertically upon a steam pin and having grooves with which to hold said glasses in an upright position, substantially as and for the purpose described.

2. In a water gage the combination with a gage glass, of a seating plate provided with an annular groove to receive the lower end of the glass, together with a gasket, of substantially double U shape in cross section adapted to fit between said groove and glass to effect a tight joint, substantially as and for the purpose described.

3. In a water gage the combination with a gage glass, of a seating plate provided with an annular groove to receive the lower end of the glass, together with a gasket, of substantially double U shape in cross section adapted to fit between said groove and glass to effect a tight joint, the said groove being provided with a nick or recess having sharp edges which will embed themselves in the gasket, substantially as and for the purpose described.

4. In a water gage the combination with a tubular glass and seating therefor of a gasket of substantially double U shape in cross section, the glass end fitting within the annular chamber formed by the gasket by its aforesaid peculiar construction, substantially as and for the purpose described.

5. In a water gage the combination with a gage glass and a collar having an annular groove fitting over the upper end of said glass, of a vertically adjustable steam pin adapted to enter the glass end, and a gasket fitting between the glass end and the collar to effect a tight joint, substantially as and for the purpose described.

6. In a water gage the combination with inner and outer glasses of a collar screwed upon a central support and having a groove to receive the upper end of the inner glass, together with an outer collar of larger diameter, placed over and vertically slidable upon the inner collar said outer collar having a groove to receive the upper end of the outer glass to hold same in a vertical position, substantially as and for the purpose described.

7. In a water gage the combination with inner and outer gage glasses of inner and outer collars having grooves adapted to fit over the ends of the gage glasses, the said outer collar being slidably mounted over the inner collar and adapted to be raised upwardly either independently or by the action of the inner collar, together with a hand wheel fitted to the inner collar and adapted to raise the collars when revolved, substantially as and for the purpose described.

8. The combination with a water gage of a float formed of cork or other suitable material having a wire passed through it, the ends of said wire being bent outwardly to form a support to rest upon the seating plate, substantially as and for the purposes set forth.

In testimony that I claim the foregoing I have hereunto set my hand this 10th day of October, 1892.

F. H. HAUSMAN.

Witnesses:
MARK M. DECKER,
E. E. MEARES.